Jan. 11, 1944. J. E. PONCHER ET AL 2,333,780
REAR VISION MIRROR
Filed Dec. 22, 1941 2 Sheets-Sheet 2
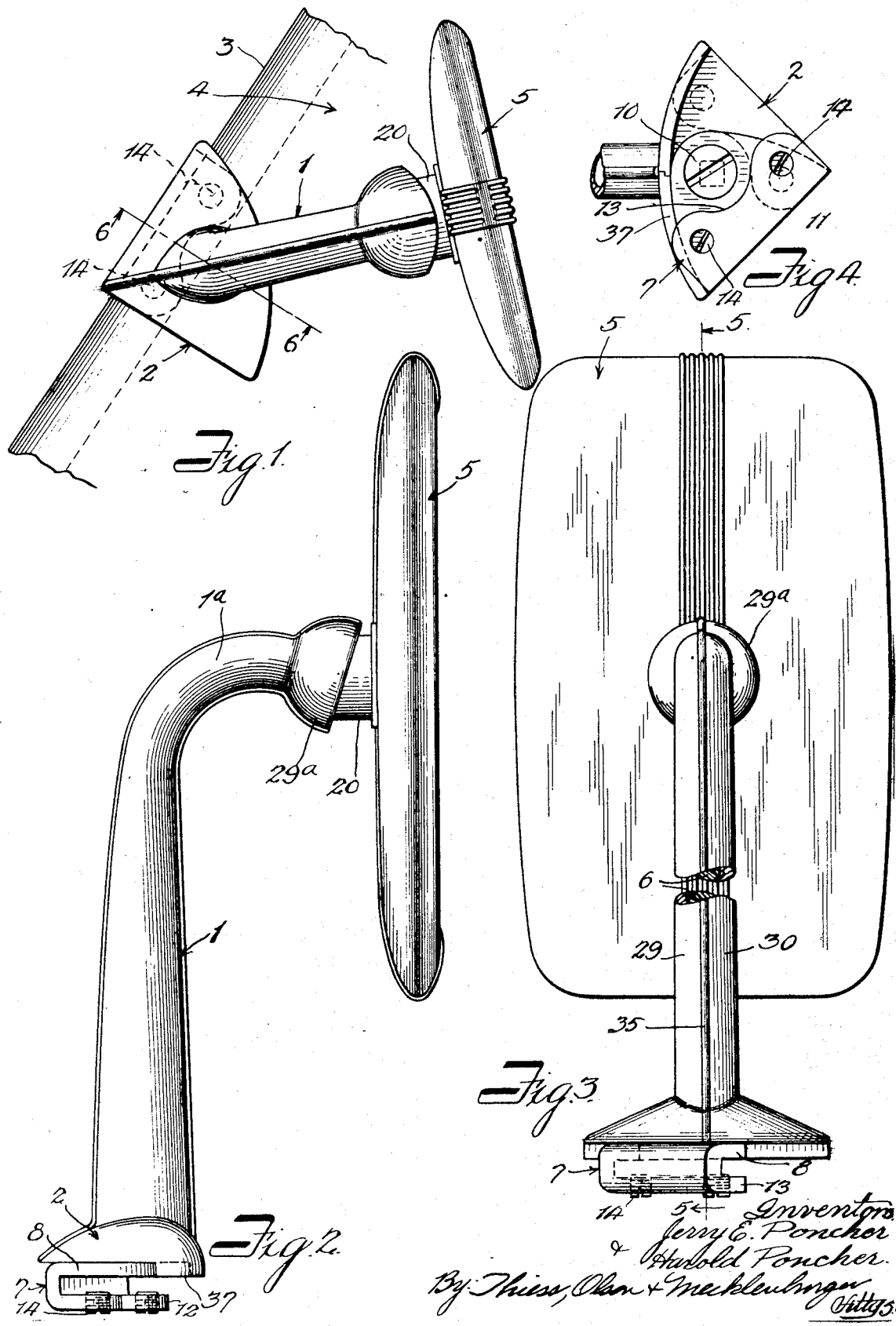

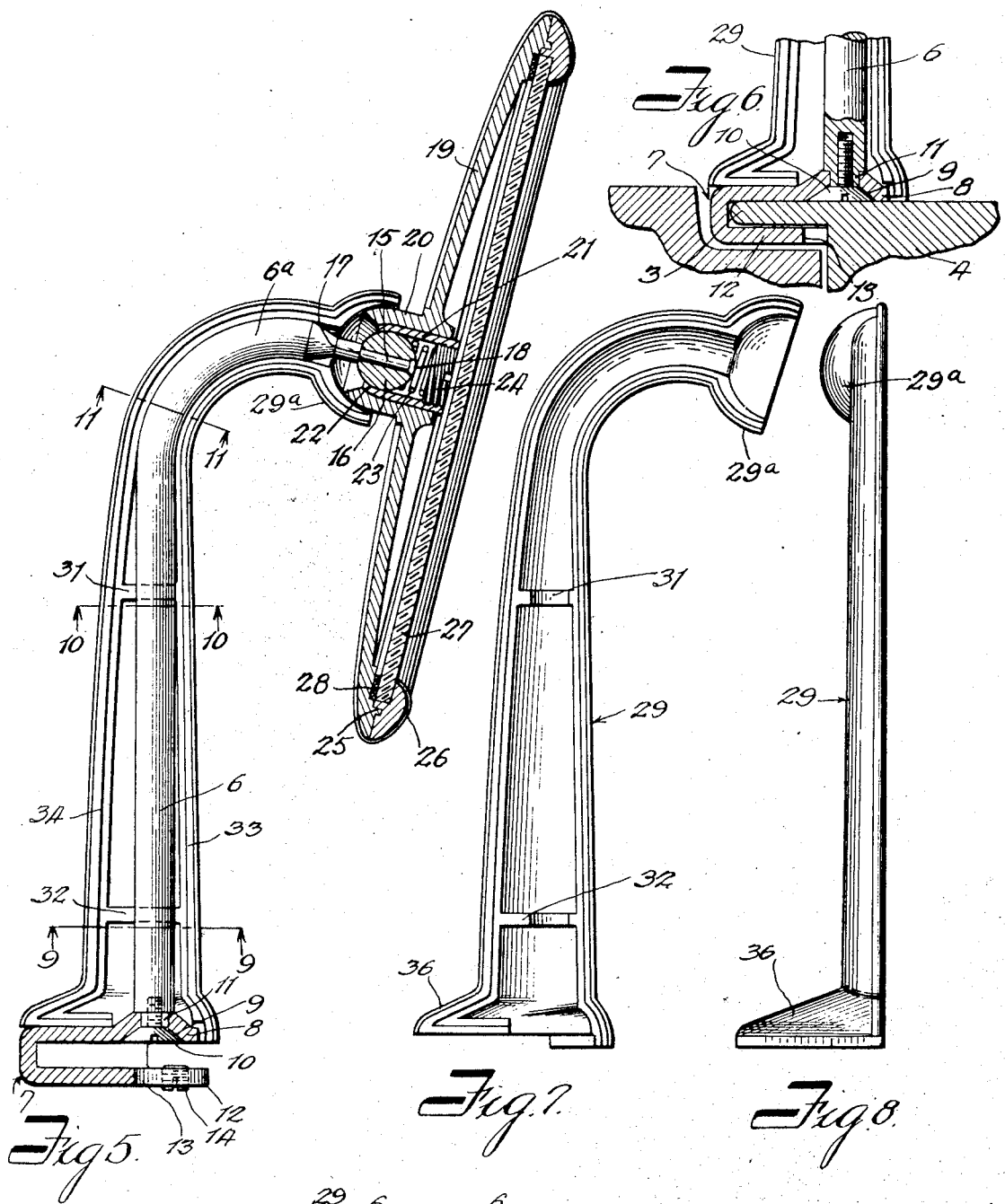

Patented Jan. 11, 1944

2,338,780

UNITED STATES PATENT OFFICE 2,338,780

REAR-VISION MIRROR

Jerry E. Poncher and Harold Poncher, Chicago, Ill.

Application December 22, 1941, Serial No. 423,908

15 Claims. (Cl. 88—98)

This invention relates to rear vision mirrors and more particularly to rear vision mirrors adapted to be secured to the marginal flange of the upper angular portion of the front door of an automobile.

An important feature of the invention is the provision of a rear view mirror adapted to be attached to either the right hand door or the left hand door of an automobile so that, insofar as rear vision characteristics are concerned, the mirror will bear the same relationship to the automobile when mounted on either door.

It is an object of the invention to provide a rear view mirror which may conveniently be mounted on the comparatively thin flange of an automobile door in a manner to prevent the removal of the device from the door when the door is closed.

Another object is to provide a device of the character described which will be comparatively free from vibration and in which the mirror is provided with a universal connection with the bracket thereby permitting relative angular adjustment sufficient to meet all normal rear vision requirements.

It is also an object of the present invention to provide a rear vision mirror structure in which the bracket and mirror-holding portions are made of plastic or other suitable molded non-metallic material and only sufficient metal is used to provide the desired rigidity and to retain the parts in assembled relationship.

A further object is the provision of the rear vision mirror of the character described, which is adaptable for positioning on either side of an automobile, and which will be cheap to manufacture, easy to assemble, convenient to install on either side of an automobile, and which will not easily get out of order.

The present invention is particularly adapted to conform with defense priority requirements. The device is constructed with a minimum amount of metal in the structure and also metallic finishes, such for instance, as chromium may be entirely eliminated. The plastic elements forming the major portion of the device are inexpensive, may easily be manufactured and assembled, and may be of any desired color and exterior finish to harmonize with the automobile on which it is to be mounted.

Further objects will be apparent from the specification and the appended claims.

In the drawings:

Fig. 1 is a side view of one embodiment of the invention attached to the thin marginal flange of the angular upper portion of an automobile door.

Fig. 2 is a side elevation of the embodiment shown in Fig. 1, and is shown detached from the automobile door.

Fig. 3 is a rear view of the device as illustrated in Fig. 2.

Fig. 4 is a bottom view of the bracket and illustrates the means for attaching the device to the flange of the auomobile door.

Fig. 5 is a sectional view taken on a line substantially corresponding to line 5—5 of Fig. 3, certain portions being shown in full lines for purposes of illustration. In this view, one of the bracket casing sections is disclosed in full lines and in position on the bracket shank, but before the non-metallic casing sections are secured together.

Fig. 6 is a detailed sectional view through the base of the device and is taken on a line substantially corresponding to line 6—6 of Fig. 1.

Fig. 7 is a side elevation of the inner side of the bracket casing shown in Fig. 5.

Fig. 8 is a rear elevation of the casing section shown in Fig. 7.

Fig. 9 is a detail sectional view taken on line 9—9 of Fig. 5.

Fig. 10 is a similar detail sectional view, but is taken on a line corresponding to line 10—10 of Fig. 5; and Fig. 11 is also a detail sectional view and is taken on the line corresponding to line 11—11 of Fig. 5.

Referring to the drawings in detail, the embodiment illustrated comprises an outwardly extending bracket portion 1 having a generally triangular-shaped base 2. The bracket is adapted to be secured to the thin marginal flange 3 of the upper angular portion of an automobile door 4. The free end of the bracket is curved rearwardly as shown at 1a and a mirror section 5 is mounted on the bracket 1 by means of a universal ball and socket connection.

Referring particularly to Fig. 5, the main bracket arm comprises a small diameter metal rod 6 having a U-shaped sheet metal attaching member 7 secured thereto. This U-shaped member 7 comprises an enlarged, generally triangular flange 8 which flange is formed and countersunk at 9 to receive the flat head of an attaching screw 10. The rod 6 is provided with a squared end 11 which end is inserted in a complementary squared opening in the flange 8, and the end of the rod is internally threaded, as illustrated to receive the screw 10. By means of this construction, the bracket may be adjusted to an angular position corresponding generally to the angle of the flange on either a right hand door or a left hand automobile door flange.

When the clamping member 7 is adjusted to either of its angular positions relative to the bracket rod 6, the curved rearwardly extending portion 6a of the rod will extend rearwardly in a substantially horizontal position when the bracket is secured to the door for which the clamping member is adjusted. It will be obvious that the rearwardly extending portion of the bracket may be slightly out of the horizontal, depending upon the angle of the door to which the device is secured. However, the universal adjustment of the mirror portion 5 enables the mirror to be adjusted relative to the bracket to meet all normal rear vision requirements irrespective of which side of the automobile the device is mounted on.

The clamping member 7 is provided with an outer flange 12 and the central portion of this flange is cut away, as shown at 13, to provide clearance for the insertion and removal of the screw 10. The flange 12 is also provided with a pair of spaced headless setscrews 14 so that the device may rigidly be secured to a door flange. The free end of the bracket rod 6 is provided with a reduced portion 15 on which is mounted a ball 16. The ball 16 is provided with a suitable opening therethrough and is mounted on the reduced portion 15 so that it rests snugly against the shoulder 17. The ball may be secured on the reduced portion in any suitable manner, preferably by means of a press fit thereon, and the reduced portion may also be riveted as shown at 18, if desired, so that the ball is rigidly held in place.

The mirror portion 5 is preferably made of molded plastic, and comprises a back section 19 having a rearwardly extending hub 20 thereon adapted to receive the ball end of the bracket rod 6. A socket 21 is mounted in the hub 20 with its outer end 22 conforming to the shape of the ball 16. The outer surface of the socket 21 is preferably knurled and may be pressed into the plastic hub 20, or it may be molded therein, if desired.

A spring 23 is mounted in the socket 21 and the socket is internally threaded to receive a headless screw 24 which may be adjusted in the socket to apply suitable spring pressure against the ball 16. By this means, the mirror may be adjusted to any suitable position, and will be frictionally retained in the adjusted position by means of the compression of the spring 23.

The face of the plastic section 19 is provided with an annular flange 25, which is adapted to be received in a complementary groove in a bezel section 26. A mirror 27 is mounted between these sections as shown, and the rear section may be provided with a suitable gasket 28 to retain the mirror snugly in position in the frame.

In assembling the sections of the mirror frame, the adjacent contact surfaces of the back section and of the bezel are coated with a suitable solvent, such, for instance, as acetone. These parts are then pressed snugly together with the mirror therebetween, and thereby a substantially integral mirror frame is formed with the mirror secured snugly therein.

A plastic casing is also provided for the bracket arm 6, and this casing comprises two complementary plastic sections 29 and 30. These casing sections may be substantially identical in cross-sectional contour, and each section is provided with an upper partition 31 and a lower partition 32. These partitions are shaped so that the partitions of the two complementary sections snugly embrace the bracket rod 6 when the sections are assembled thereon. The upper curved end 6a of the bracket rod 6 snugly fits the contour of the casing sections when they are clamped thereon, as illustrated in detail in Fig. 11. The marginal edges of the two casing sections are so formed as to provide complementary shoulders 33 and 34 (Figs. 9, 10 and 11), so that the sections are retained in perfect alignment on bracket arm 6. The section 30 is also provided on each side with a marginal rib 35, which rib is adapted to overhang the edge of the section 29 when the sections are mounted on the bracket rod. The casing sections 29 and 30 are provided at their free ends with complementary enlarged portions 29a which form a partial enclosure for the ball and socket joint, as shown in Fig. 5.

Each plastic section is also provided with an enlarged base portion 36, and these base portions, when the device is assembled, co-operate and form a substantially triangular base, such as illustrated in Figs. 1 and 4. The edges of these bases are adapted to align with the edge of the corresponding angular automobile door flange to which the device is secured. The plastic sections 29 and 30 may be secured together by means of acetone or other suitable solvent in the same manner as previously described for the mirror section. The base portion, when the device is assembled, provides a depending flange 37 which rests against the face of the automobile door when the device is secured thereto, and provides a more attractive finish to the mounted fixture.

Fig. 4 illustrates the clamping member 7 in a position to secure the device to the right hand door of an automobile, and, when it is desired to secure the device to the left hand door, the screw 10 is removed or sufficiently loosened so that the clamping member may be moved to the position illustrated by dotted lines, and the clamping member is then again secured snugly to the bracket rod 6 by means of the screw 10. After the clamping member is positioned over the flanges of the door for which it has been adjusted, the headless screws 14 are tightened to clamp the device securely thereon. When the door is closed, the screws 14 are between the door and a corner post or other body portion of the car and are, therefore, inaccessible when the door is closed.

It will be understood that although the use of plastic sections secured together and made substantially integral by means of a suitable solvent is preferable, they may be formed of any suitable molded material and secured together by means of an appropriate adhesive.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

Having thus described this invention, what is claimed and desired to be secured by Letters Patent is:

1. In a rear vision mirror, a U-shaped member formed to closely embrace the marginal flange of an automobile door so that the inner arm of said member is enclosed between the door and the door jamb when the door is closed, means on said inner arm and accessible to clamp said member on said door flange only when said door is open, and an outwardly extending mirror-supporting bracket on said U-shaped member.

2. In a rear vision mirror, a U-shaped member formed to closely embrace the marginal flange of an automobile door so that the inner arm of said member is enclosed between the door and the door jamb when the door is closed, means on said inner arm and accessible to clamp said member on said door flange only when said door is open, an outwardly extending mirror-supporting bracket on said U-shaped member, and a plastic casing enclosing said bracket and covering the outer portion of said member.

3. A rear vision mirror comprising a U-shaped member formed to closely embrace the marginal flange of an automobile door, releasable means on said inner arm to secure said member to said flange so that said means is inaccessible when said door is closed, an outwardly extending rod secured to the outer arm of said member, a mirror assembly including a mirror and casing therefor, a ball and socket connection between said casing and the free end of said rod, and a plastic casing around substantially the entire length of said rod, said rod casing comprising two complementary longitudinal sections secured together by means of a solvent to form an integral casing snugly clamping said rod therebetween, the outer ends of said casing being enlarged to form an integral partial housing for said ball and socket connection.

4. A rear vision mirror comprising a U-shaped member formed to closely embrace the marginal flange of an automobile door, releasable means on said inner arm to secure said member to said flange so that said means is inaccessible when said door is closed, an outwardly extending rod secured to the outer arm of said member, a mirror assembly including a mirror and casing therefor, said casing comprising a plastic back panel and a plastic bezel having complemental tongue and groove contacting surfaces secured together by means of a solvent to form an integral casing to enclose said mirror, a ball and socket connection between said casing and the free end of said rod, and a plastic casing around substantially the entire length of said rod, said rod casing comprising two complementary longitudinal sections secured together by means of a solvent to form an integral casing snugly clamping said rod therebetween, the outer ends of said casing being enlarged to form an integral partial housing for said ball and socket connection.

5. In a reversible bracket for a rear vision mirror, said bracket having a rear vision mirror on the free end thereof, a base to lie against the face of either the right hand or left hand door of an automobile, a clamp on said base and constructed to embrace the angular flange of either of said doors, and means to fixedly secure said clamp to said bracket in either of two definitely located and spaced angular positions around an axis of said bracket so that said mirror may assume the same relative rear vision positions irrespective of which door the device is mounted on.

6. A reversible rear vision bracket for mounting on either the right hand or left hand door of an automobile, comprising an elongated rod, means for pivotally mounting a mirror on the free end of said rod, a thin U-shaped member adapted to embrace the thin marginal flange of an automobile door, means to lock said member to said rod in a plurality of different definitely located and spaced radial positions, and means to clamp said member to said flange.

7. A reversible rear vision bracket for mounting on either the right hand or left hand door of an automobile, comprising an elongated rod, means for pivotally mounting a mirror on the free end of said rod, a thin U-shaped member adapted to embrace the thin marginal flange of an automobile door, means to lock said member to said rod in a plurality of different definitely located and spaced radial positions, means to clamp said member to said flange, and a plastic casing enclosing said rod, said casing having a base portion covering said member in any adjusted position thereof.

8. A rear vision mirror comprising an elongated bracket arm adapted to be mounted on the flange of an automobile door to extend laterally therefrom, the outer end of said arm terminating in a rearwardly facing portion, a mirror and casing therefor, a universal joint connection between the back of said mirror casing and said rearwardly facing portion of said arm, means to limit the universal angular movement of said mirror while permitting rotational movement thereof, a U-shaped clamp adapted to embrace the upper front angular flange of an automobile door, means to fixedly secure said clamp to the base of said arm in a selected one of a plurality of radial positions so that said arm may be mounted on either front door of an automobile and said mirror may assume the same relative rear vision positions irrespective of which door the device is mounted on.

9. A rear vision mirror comprising an elongated arm having a rearwardly extending free end, the other end of said arm having a U-shaped clamp adapted to embrace the angular front door flange of an automobile to support said arm in a substantially horizontal position, means to fixedly position said clamp radially on said arm in any one of a plurality of different definitely located and spaced positions so that said arm may be supported in substantially the same relative position with respect to either the right or left hand door with the mirror in a substantially vertical plane.

10. A rear vision mirror comprising a base member, means to secure said base member to the marginal flange of an automobile door, said securing means being positioned so that it is inaccessible when said door is closed, an elongated horizontally extending bracket arm secured to said member, the rear end of said arm being curved rearwardly in a substantially horizontal plane, a mirror unit pivotally mounted on the free end of said arm, and means to adjust said base member radially on said arm to any one of a plurality of different definitely located and spaced positions so that said mirror may be mounted on either side of an automobile with the curved arm and mirror in substantially the same relative rear vision position.

11. A U-shaped bracket adapted to embrace the thin flange of an automobile door, one or more headless screws in the inner arm of said bracket and adapted to engage said flange to retain said bracket rigidly thereon, the outer arm of said bracket extending materially beyond said screws, and a laterally extending post secured to said extended portion substantially on the median line of said bracket at a right angle to the face of said bracket.

12. A rear vision mirror comprising a U-shaped clamping bracket, the arms of which embrace the flange of an automobile door, a mirror supporting arm extending laterally from said clamping bracket, and means for securing said arm to said bracket comprising a screw extending through the outer arm of said bracket and threaded into said arm, the head of said screw being on the inside of said outer arm.

13. A rear vision mirror comprising a U-shaped clamping bracket, the arms of which embrace the flange of an automobile door, a mirror supporting arm extending laterally from said clamping bracket, and means for securing said arm to said bracket comprising a screw extending through the outer arm of said bracket and threaded into said arm, the head of said screw being on the inside of said outer arm, said outer arm having a noncircular opening therein, said arm having a noncircular portion fittable in said opening in a plurality of different definitely located and spaced positions of rotary adjustment about the axis of said arm.

14. A rear vision mirror comprising a U-shaped clamping bracket, the arms of which embrace the flange of an automobile door, a mirror supporting arm extending laterally from said clamping bracket, and means for securing said arm to said bracket comprising a screw extending through the outer arm of said bracket and threaded into said arm, the head of said screw being on the inside of said outer arm, said outer arm having a noncircular opening therein, said arm having a noncircular portion fittable in said opening in a plurality of different definitely located and spaced positions of rotary adjustment about the axis of said arm, said arm having an outer rearwardly extending portion on which the mirror is mounted.

15. A rear vision mirror comprising a U-shaped clamping bracket, the arms of which embrace the flange of an automobile door, a mirror supporting arm extending laterally from said clamping bracket, means for securing said arm to said bracket comprising a screw extending through the outer arm of said bracket and threaded into said arm, the head of said screw being on the inside of said outer arm, and a screw threaded through an opening in the inner arm for clamping the bracket on the door flange.

JERRY E. PONCHER.
HAROLD PONCHER.